United States Patent [19]
Edwards

[11] Patent Number: 5,243,003
[45] Date of Patent: Sep. 7, 1993

[54] ACRYLIC/CARBONATE RESIN COMPOSITIONS

[76] Inventor: Bill R. Edwards, 809 E. Jackson, Broken Arrow, Okla. 74012

[21] Appl. No.: 903,850

[22] Filed: Jun. 25, 1992

[51] Int. Cl.$^5$ .................... C08F 2/38; C08F 18/24; C08F 220/10
[52] U.S. Cl. .................... 526/224; 526/314; 526/328.5
[58] Field of Search .................... 526/224

[56] References Cited

U.S. PATENT DOCUMENTS

| | | | |
|---|---|---|---|
| Re. 31,165 | 3/1988 | Serini et al. | 525/67 |
| 2,440,318 | 4/1948 | White et al. | 260/83 |
| 2,445,536 | 7/1948 | Parsons et al. | 260/77.5 |
| 2,687,395 | 8/1951 | Marks | 260/41 |
| 2,964,501 | 12/1960 | Sarofeen | 260/77.5 |
| 3,250,813 | 5/1966 | Stephenson | 260/614 |
| 3,268,484 | 8/1966 | Costanza et al. | 260/77.5 |
| 3,288,735 | 11/1966 | Watanabe et al. | 260/17.4 |
| 3,487,062 | 12/1969 | Bodycot | 260/89.5 |
| 3,780,156 | 12/1973 | Cameron | 264/300 |
| 3,847,865 | 11/1974 | Duggins | 260/42.52 |

(List continued on next page.)

FOREIGN PATENT DOCUMENTS

| | | |
|---|---|---|
| 2340521 | 2/1975 | Fed. Rep. of Germany . |
| 158247 | 1/1983 | Fed. Rep. of Germany . |
| 48-18378 | 8/1973 | Japan . |
| 53-104621 | 9/1978 | Japan . |
| 60-103065 | 6/1985 | Japan . |
| 60-137906 | 7/1985 | Japan . |
| 61-26605 | 2/1986 | Japan . |
| 61122747 | 5/1988 | Japan . |
| 0145408 | 2/1989 | Japan . |
| 01192683 | 8/1989 | Japan . |
| 1103947 | 2/1968 | United Kingdom . |
| 1191872 | 5/1970 | United Kingdom . |

OTHER PUBLICATIONS

Chemical Abstract 79:6168t; 1973 Azo-type curing agents for unsaturated polyesters.
Chemical Abstrct 105:209561q; 1986 Mixtuers of azoalkanes.
Chemical Abstract 100:52876t; 1984 Azo compounds for free radical crosslinking polysiloxane stationary phases.

Primary Examiner—Joseph L. Schofer
Assistant Examiner—Wu C. Cheng
Attorney, Agent, or Firm—Hovey, Williams, Timmons & Collins

[57] ABSTRACT

Acrylic/carbonate resins are provided which have excellent weatherability, outstanding transparency and improved heat and solvent resistance, as well as improved impact strength. The acrylic/carbonate resins comprise an intimate blend of a polymerization syrup and a catalytic amount of a polymerization catalyst capable of effecting polymerization of the syrup. The polymerization syrup, which has an improved shelf life and can be stored at ambient temperature and atmospheric pressure, consists essentially of:

(a) from about 10 to about 990 parts per volume of an acrylic monomer represented by the formula $$CH_2 = \underset{\underset{CH_3}{|}}{C} - COOR$$

wherein R is an alkyl moiety containing 1 to about 10 carbon atoms;

(b) from about 990 to about 10 parts by volume diallyl diglycol carbonate monomer;

(c) from about 0.1 to about 20 parts by volume of a mercaptan; and (d) from about 0.3 to about 300 parts by volume of a crosslinking agent compatible with the acrylic monomer.

The polymerization syrup can further contain from about 0.1 to 20 parts by volume tetrahydrofuran and from about 30 to about 100 parts by volume of a urethane monomer.

11 Claims, No Drawings

U.S. PATENT DOCUMENTS

| | | | |
|---|---|---|---|
| 3,957,921 | 5/1976 | Iwahashi et al. | 260/901 |
| 4,032,596 | 6/1977 | Uffner et al. | 260/862 |
| 4,113,803 | 9/1978 | Price | 260/885 |
| 4,152,506 | 5/1979 | Novak | 526/224 |
| 4,159,301 | 6/1979 | Buser et al. | 264/331 |
| 4,188,315 | 2/1980 | Dudinyak | 260/40 R |
| 4,210,565 | 7/1980 | Emmons | 260/29.6 TA |
| 4,214,064 | 7/1980 | Kanazawa | 526/193 |
| 4,260,564 | 4/1981 | Baiocchi et al. | 264/2.2 |
| 4,319,003 | 3/1982 | Gardlund | 525/148 |
| 4,528,351 | 7/1985 | Tarumi et al. | 526/314 |
| 4,588,798 | 5/1986 | Heitner | 526/228 |
| 4,597,916 | 7/1986 | Chen | 261/94 |
| 4,743,654 | 5/1988 | Kyu et al. | 525/148 |
| 4,745,029 | 5/1988 | Kambour | 428/412 |
| 4,771,095 | 9/1988 | Hanisch et al. | 524/437 |
| 4,791,184 | 12/1988 | Nagai et al. | 526/323.2 |
| 4,841,016 | 6/1989 | Edwards | 528/272 |
| 4,945,122 | 7/1990 | Edwards | 524/166 |

ACRYLIC/CARBONATE RESIN COMPOSITIONS

BACKGROUND OF THE INVENTION

1. Field of the Invention

The present invention relates to polymeric resin compositions, and more particularly but not by way of limitation, to an acrylic monomer/carbonate monomer based polymerization syrup having improved shelf life. In one aspect, the present invention relates to a polymerization syrup formulated of an acrylic monomer and a carbonate monomer which, upon activation, provides a resinous composition curable at ambient temperatures and pressure.

2. Brief Description of the Prior Art

Acrylic resins utilizing methyl methacrylate as the base monomer have heretofore been known. Because acrylic resins formed of methyl methacrylate are linear polymers, the polymers have exhibited good weatherability and transparency. However, such polymers have suffered from disadvantages in that they are deficient in resistance to heat and solvents, and are often deficient in impact strength and surface hardness. Because of these deficiencies the prior art is replete with acrylic based resin compositions wherein the base monomer, i.e. methyl methacrylate, is copolymerized with other polymers.

While various methods and resin compositions have been proposed for improving the resistance of acrylic based polymers to heat and solvents, as well as to improve the impact strength and surface hardness of such polymers, the resulting polymers generally have poor color and/or a tendency to become colored on heating; and the weatherability and transparency properties of such polymers are often sacrificed or reduced.

Many of the problems inherent with the prior art acrylic based resin compositions have been overcome by a polymerization syrup containing a major portion of an acrylic monomer, a minor effective amount of a non-peroxide oxygen donator (such as 2,2-bis(allyloxymethyl)-butan-1-ol or diallylphthalate), a mercaptan and a cross linking agent compatible with the acrylic monomer as disclosed in my U.S. Pat. Nos. 5,023,313, 5,045,613 and 4,945,122. While acrylic resin compositions utilizing such a polymerization syrup have generally exhibited improved physical and chemical properties, a need still remains for resin compositions having improved color and transparency, as well as improved impact strength and resistant to solvents. That is, a need still remains for improved resin compositions which can be employed to cast sheets or articles of varying thickness which are substantially void or bubble free, and which possess improved color, transparency, solvent resistance and impact strength, but do not require post curing. It is to such a polymerization syrup and resin composition that the present invention is directed.

SUMMARY OF THE INVENTION

In accordance with the present invention a polymerization syrup formulated of a blend of an acrylic monomer and a carbonate monomer is provided which, when catalyzed, provides an acrylic/carbonate polymeric resin having excellent weatherability, outstanding color and transparency, solvent resistance, impact strength and surface hardness. In addition, the polymerization syrup has an improved shelf life.

The polymerization syrup of the present invention can be activated or catalyzed by the addition of a catalytic amount of a polymerization catalyst capable of effecting polymerization of the syrup, by exposure to ultraviolet light or a combination thereof; and the resulting polymeric resin is curable at ambient temperatures and pressures without the requirement of post curing.

The polymerization syrup of the present invention consist essentially of:

(a) from about 10 to about 990 parts by volume of an acrylic monomer represented by the general formula

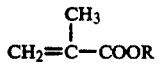

wherein R is an alkyl moiety containing from 1 to about 18 carbon atoms;

(b) from about 990 to about 10 parts by volume of a carbonate monomer, such as diallyl diglycol carbonate;

(c) from about 0.1 to about 20 parts by volume of a mercaptan; and (d) from about 0.3 to about 300 parts by volume of a cross linking agent compatible with the acrylic monomer and the carbonate monomer.

The polymerization syrup described above, can be stored at ambient temperatures and pressure in the absence of exposure to ultraviolet light without deterioration. That is, the polymerization syrup of the present invention can be stored and transported, without the need of refrigeration, provided the polymerization syrup is shielded from exposure to ultraviolet light. If desired, the shelf life of the polymerization syrup can be further enhanced by the addition of from about 0.1 to about 20 parts by volume of tetrahydrofuran.

An object of the present invention is to provide a polymerization syrup which, when catalyzed, provides a polymeric resin curable at ambient temperatures and pressure.

Another object of the present invention, while achieving the before-stated object, is to provide a polymerization syrup having improved shelf life which, upon activation, permits one to cast articles or sheets of varying thickness which are substantially void and bubble free and do not require post curing.

Yet another object of the present invention, while achieving the before-stated object, is to provide a polymeric resin having improved color and transparency, without sacrificing impact strength, resistance to solvents, weatherability and the like.

Other objects, advantages and features of the present invention will become apparent upon reading of the following detailed description in conjunction with the appended claims.

DETAILED DESCRIPTION

The present invention provides an acrylic monomer/carbonate monomer based polymerization syrup which, when catalyzed, produces a polymeric resin having outstanding color, transparency, impact strength, weatherability and resistance to solvents. Further, the polymeric resin is curable at ambient temperature and pressure and does not require post curing.

The polymerization syrup of the present invention consists essentially of:

(a) from about 10 to about 990 parts by volume of an acrylic monomer represented by the general formula

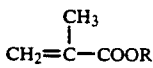

wherein R is alkyl moiety containing from 1 to about 18 carbon atoms;

(b) from about 990 to about 10 parts per volume of a carbonate monomer, such as diallyl diglycol carbonate;

(c) from about 0.1 to about 20 parts per volume of a mercaptan; and (d) from about 0.3 to about 300 parts by volume of a cross linking agent compatible with the acrylic monomer and the carbonate monomer.

In formulating the polymerization syrup of the present invention any suitable acrylic monomer which is compatible with the carbonate monomer can be employed. Generally, such acrylic monomers are represented by the formula

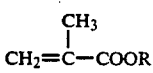

wherein R is an alkyl moiety containing 1 to about 18 carbon atoms, and more desirably from 1 to about 8 carbon atoms. Examples of alkyl moieties satisfying the definition of R in the before described formula include methyl, ethyl, propyl, butyl, pentyl, hexyl, heptyl, octyl, nonyl, decyl, undecyl, dodecyl, tetradecyl, pentadecyl, hexadecyl, heptadecyl, octadecyl and the like. Specific examples of acrylic monomers satisfying the above defined formula and which can be employed in the formulation of the polymerization syrup of the present invention include methyl methacrylate, ethyl methacrylate, n-butyl methacrylate, 2-ethylhexyl methacrylate, cyclohexyl methacrylate, $\omega$-hydroxyalkyl methacrylates, and the like.

In discussing the carbonate monomer employed in the formulation of the polymerization syrup of the present invention, reference will be made to diallyl glycol carbonate for convenience of description purposes. However, it is to be understood that the carbonate monomer is not limited to diallyl diglycol carbonate, but extends also to those carbonate monomers which, when admixed with an acrylic monomer as defined herein, produce a polymerization syrup exhibiting the same or similar chemical and physical properties as the polymerization syrup formulated from an acrylic monomer and diallyl diglycol carbonate.

The amount of the acrylic monomer and diallyl diglycol carbonate present in the polymerization syrup can vary widely and will depend to a large degree on the end use of the resulting polymeric resin. That is, the amount of the acrylic monomer present in the polymerization syrup will generally be in an amount sufficient to provide the polymerization syrup with from about 10 to about 990 parts by volume of the acrylic monomer, and the amount of diallyl diglycol carbonate present in the polymerization syrup will generally be in an amount sufficient to provide the polymerization syrup with from about 990 to about 10 parts by volume of the diallyl diglycol carbonate. However, especially desirable results have been obtained when the polymerization syrup contains from about 500 to about 700 parts by volume of the acrylic monomer and from about 300 to about 500 parts by volume of the diallyl diglycol carbonate (i.e. the carbonate monomer).

The mercaptan employed in the formulation of the polymerization syrup is represented by the general formula

wherein R' contains from 1 to about 22 carbon atoms. Further, R' can be any suitable moiety, such as an alkyl moiety, a cycloaliphatic moiety and the like. Illustrative of such mercaptans are methyl mercaptan, propyl mercaptan, n-octyl mercaptan, n-dodecyl mercaptan, dilimonen dimercaptan, cyclohexyl dimercaptan, ethylcyclohexyl dimercaptan, and mixed primary tridecyl mercaptan.

It should be noted that the only requirement for the mercaptan is that the mercaptan be in a liquid state under the conditions of mixing, and that the mercaptan be compatible with the acrylic and carbonate monomers employed in the formulation of the polymerization syrup, as well as with the cross linking agent utilized in the formulation of the polymerization syrup.

The amount of the mercaptan employed in the formulation of the polymerization syrup can vary widely and will depend, to a large degree upon the acrylic monomer and carbonate monomer employed, as well as the mercaptan selected. Generally, however, the amount of mercaptan present in the polymerization syrup will range from about 0.I to about 20 parts per volume, and more desirably from about 0.3 to about 3 parts by volume.

The polymerization syrup of the present invention (in addition to the acrylic monomer, carbonate monomer and the mercaptan) further includes the cross linking agent. Cross linking agents are well known in the art; and any suitable compound capable of cross linking the acrylic and carbonate monomers present in the polymerization syrup can be employed. Illustrative examples of cross linking agents which may be employed in the formulation of the polymerization syrup of the present invention include ethylene glycol dimethacrylate, 2-ethylhexyl acrylate, methyl acrylate, allyl methacrylate, allyl acrylate, ethylene glycol diacrylate, polyethylene glycol dimethacrylate, diethylene glycol dimethacrylate, triethylene glycol dimethacrylate, 1,3-butylene glycol dimethacrylate, trimethyolpropane triacrylate, trimethyolpropane trimethacrylate, tripropylene glycol diacrylate, n-hexyl acrylate, iso-octyl acrylate, iso-decyl acrylate, lauryl acrylate, phenoxyl ethyl acrylate, methoxy ethyl acrylate, cyclohexyl methacrylate, tetrahydrofurfuryl methacrylate, iso-decyl methacrylate, lauryl methacrylate (both natural and synthetic), $C_{12}-C_{20}$ methacrylate, cross linking monomers, and stearyl methacrylate.

The amount of cross linking agent employed can vary widely and will be determined to a large degree by the efficiency of the cross linking agent. That is, for a strong cross linking agent (i.e. as ethylene glycol dimethacrylate, 2-ethylhexyl acrylate or methyl acrylate) the concentration of the cross linking agent required will be less than when using less effective cross linking agents. However, it has generally been found that when formulating the polymerization syrup of the present invention the amount of cross linking agent employed will be an amount sufficient to provide the polymerization syrup with from about 0.3 to about 300 parts by volume of the cross linking agent, and more desirably from about 4 to 8 parts per volume of the cross linking agent.

The polymerization syrup may further include an effective minor amount of tetrahydrofuran. The tetrahydrofuran provides a dual function; that is, incorporation of tetrahydrofuran into the polymerization syrup enhances the shelf life of the polymerization syrup, and the tetrahydrofuran also functions as an exotherm control agent. It should be understood that while tetrahydrofuran has been found effective not only to enhance the shelf life of the polymerization syrup, but also as an exotherm control agent for controlling the polymerization rate of the polymerization syrup, other suitable compounds capable of functioning in a similar manner as tetrahydrofuran can be employed provided such compounds are compatible with the other constituents in the polymerization syrup. Thus, compounds which are capable as functioning as a preservative and/or exotherm control agent for the polymerization syrup, without adversely effecting the properties of the resulting resinous composition, are to be understood as being included within the subject disclosure.

The amount of tetrahydrofuran incorporated into the polymerization syrup can vary widely and will be dependent, to a large degree, upon the acrylic and carbonate monomers selected in the formulation of the polymerization syrup. However, desirable results can generally be obtained when tetrahydrofuran is incorporated into the syrup in an amount sufficient to provide the polymerization syrup with from about 0.1 to about 20 parts by volume, more desirable about 1 to about 5 parts by volume, of the tetrahydrofuran.

To enhance mold release it is often desirable to incorporate an effective minor amount of an internal mold release agent into the polymerization syrup. The amount of the internal mold release agent incorporated into the polymerization syrup can vary widely, but will generally be an amount sufficient to provide the polymerization syrup with from about 0.01 to about 2 parts by volume of the internal mold release agent.

Any suitable internal mold release agent which is compatible with the constituents of the polymerization syrup can be employed. For example, desirable results have been obtained wherein the internal mold release agent is an anionic or nonionic surfactant which is compatible with the acrylic and carbonate monomers and which does not reduce the transparency of the resulting polymeric resin. Examples of the suitable anionic surfactant include:

sodium alkyl sulfate, (such as sodium octylsulfate, sodium laurylsulfate, sodium stearylsulfate);

sodium alkylbenzenesulfates, such as sodium dodecylbenzenesulfate;

sodium alkylsulfonates, such as sodium cetylsulfonate and sodium stearylsulfonate;

sodium diallyl sulfosuccinates, such as sodium dioctyl sulfosuccinate, and the like.

Examples of nonionic surfactants include:

polyethyleneglycol alkyl ethers, such as polyethyleneglycol oleyl ether, polyethyleneglycol lauryl ether, and the like;

polyethyleneglycol alkylphenyl ethers, such as polyethyleneglycol nonylphenyl ether;

higher fatty acid esters of polyethyleneglycol, such as oleic acid ester of polyethyleneglycol, stearic acid ester of polyethyleneglycol, lauric acid ester of polyethyleneglycol, and the like;

polyethyleneglycol polypropyleneglycol ether;

sorbitan fatty acid esters, such as sorbitan monolaurate, sorbitan monostearate, and the like;

polyethylene glycol sorbitan fatty acid esters, such as polyethyleneglycol sorbitan monolauric acid ester, polyethyleneglycol sorbitan monooleic acid ester, phosphoric acid esters of polyethyleneglycol; and phosphoric acid esters of alkylpolyethyleneglycol and the like.

The surfactants listed above are merely illustrative of anionic and nonionic surfactants which can be employed as the internal mold release agent i the formulation of the polymerization syrup of the present invention.

In addition to the internal mold release agent, other additives which do not interfere with the quality or characteristics of the polymerization syrup or the resulting polymeric resin can be incorporated into the syrup. Typical of such other additives are coloring agents and other appropriate additives which may be desired depending on the end use of the polymerization syrup.

In order to provide the polymerization syrup with a desired viscosity, which is indicative of the molecular weight of the polymeric resin resulting from catalyzing the syrup (either by the addition of a catalytic amount of a quaternary ammonium salt, exposure of the polymerization syrup to ultraviolet light, or a combination thereof), the polymerization syrup is heated to a temperature of from about 55° C. to about 85° C. for a period of time effective to provide the polymerization syrup with the desired viscosity. That is, the polymerization syrup is heated at a temperature of from about 55° C. to about 85° C. for a period of tie effective to provide the polymerization syrup with the desired viscosity. As will be appreciated, the desired viscosity of the polymerization syrup will be dependent upon the end use of the polymeric resin produced by catalyzation of the polymerization syrup. For most uses, however, the desired viscosity of the polymerization syrup can be achieved when the polymerization syrup is heated at a temperature within the above specified range for a period of from about 10 to about 90 minutes.

As previously stated the polymerization syrup of the present invention can be catalyzed by the addition of a catalytic amount of a quaternary ammonium salt, by exposure to ultraviolet light or a combination thereof. The quaternary ammonium salts employed as the catalyst are generally known as "fabric softeners". Illustrative examples of quaternary ammonium salts which can be employed to catalyze the polymerization syrup of the present invention are:

dialkyldimethylammonium chlorides, such as dicocodimethylammonium chloride and ditallowdimethylammonium chloride;

dialkyldimethylammonium methylsulfates;

alkyltrimethylammonium chlorides, such as soya trimethylammonium chloride, hydrogenated tallow trimethylammonium chloride, palmityltrimethylammonium chloride, cocotrimethylammonium chloride, tallow trimethylammonium chloride, and benzyltrimethylammonium chloride; and alkyldimethylbenzylammonium chlorides, such as dimethylalkyl ($C_{14}$–$C_{18}$) benzylammonia chloride and dimethylalkyl ($C_{12}$–$C_{16}$) benzylammonium chloride.

It should be noted that the above examples are merely illustrative of the quaternary ammonium salts which can be used as a catalyst for the polymerization syrup of the present invention to produce a polymeric resin from a blend of acrylic monomers of carbonate monomers. However, especially desirable results have been obtained wherein dicocodimethylammonium chloride, benzyltrimethylammonium chloride, trimethyldodecylammonium chloride dimethylalkyl ($C_{12}$–$C_{16}$) benzylammonium chloride and diemthylstearylbenzylammonium chloride are employed as the catalyst.

The amount of the quaternary ammonium salt employed to catalyze the polymerization syrup can vary widely and will be dependent to a large degree upon the acrylic and carbonate monomers employed in the formulation of the polymerization syrup, as well as the quaternary ammonium salt chosen as the catalyst.

Because of the exothermic nature of the polymeric resins the amount of the quaternary ammonium salt incorporated into the polymerization syrup will also vary depending upon the thickness of the article molded. That is, for thicker articles a lesser amount of catalyst is required to catalyze the syrup because of the exothermic nature of the polymeric resin. Generally, however, the amount of the quaternary ammonium salt employed to catalyze the polymerization syrup will be an amount sufficient to provide the polymerization syrup with from about 0.01 to about 15 parts by volume catalyst, based on the total volume of the monomers of the polymerization syrup.

A urethane monomer can also be incorporated into the polymerization syrup to enhance the optical clarity of articles molded from polymeric resins produced from the polymerization syrup. In discussing a urethane containing monomer, reference will be made to a urethane acrylate/acrylate monomer blend marketed by Radcure Specialties, Inc. of Louisville, Ky. under the tradename "Ebecryl 264" for convenience of description purposes. However, it is to be understood that the urethane monomer is not limited to the before-identified urethane acrylate/acrylate monomer blend, but extends also to urethane monomers which, when incorporated into the polymerization syrup, produces a polymeric resin having improved clarity while exhibiting the same or similar characteristics as polymeric resin formulated from a polymerization syrup containing an acrylic monomer and diallyl diglycol carbonate as hereinbefore described.

The amount of the urethane monomer present in the polymerization syrup can vary widely and will depend to a large degree on the end use of the polymeric resin. However, the amount of the urethane monomer employed will generally be an amount sufficient to provide the polymerization syrup with from about 30 to about 100 parts by volume of the urethane monomer.

When it is desirable to provide articles utilizing a polymeric resin formulated from the polymerization syrup of the present invention which have a granite-like appearance, an effective amount of a particulate filler can be admixed into the polymerization syrup prior to catalyzing the polymerization syrup.

The amount of the particulate filler admixed with the polymerization syrup can vary widely and will generally depend upon the desired density of the cured articles, as well as the intended use of articles molded from the particulate filled polymeric resin. Generally, however, the amount of the particulate filler employed is an amount sufficient to provide from about 12 to about 90 parts by weight of the particulate filler, based on the weight of the polymerization syrup.

The particle size of the particulate filler can also vary widely and will generally depend upon the ability of the polymerization syrup to wet the particulate filler and the pourability of the particulate filled polymeric composition. Any suitable particulate filler can be used as long as the filler is compatible with the polymerization syrup and has an average particle size of less than about 100 microns. Desirably, the particulate filler will have an average particle size of from about 20 to about 40 microns. Examples of suitable materials which can be incorporated into the polymerization syrup of the present invention are alumina trihydrate ($Al_2O_3.3H_2O$), carbon black, graphite, iron oxides, mixtures thereof and the like.

PREPARATION OF POLYMERIZATION SYRUP

A. In the preparation of the polymerization syrup an acrylic monomer and a carbonate monomer are selected. While any suitable acrylic monomer satisfying the definition of the acrylic monomers et forth hereinbefore can be employed, especially desirable results have been obtained wherein the acrylic monomer is methyl methacrylate. Similarly, any suitable carbonate monomer which is compatible with the acrylic monomer can be employed. However, especially desirable results have been obtained wherein the carbonate monomer is diallyl diglycol carbonate.

The acrylic monomer and carbonate monomer are transferred to a mixing vessel and the mercaptan and the cross linking agent are then added to form a polymerization syrup containing from about 10 to about 990 parts by volume of the acrylic monomer, from about 990 to about 10 parts by volume of the carbonate monomer, from about 0.1 to about 20 parts by volume of the mercaptan and from about 0.3 to about 300 parts by volume of the cross linking agent. The polymerization syrup is thereafter heated to a temperature of from about 80° C. to about 110° C. for a period of time effective to provide the polymerization syrup with the desired viscosity.

When the polymerization syrup has achieved the desired viscosity, heat is removed and the polymerization syrup is allowed to cool prior to storage. It should be noted that because the polymerization syrup can be catalyzed by exposure to ultraviolet light (without incorporation of ultra violet initiators) storage of the syrup must be in a container or area in the absence of ultraviolet light. Further, a polymerization syrup prepared in accordance with the procedure set forth above has exhibited an improved shelf life, and storage can be achieved without refrigeration or cooling of the syrup.

While the polymerization syrup prepared in accordance with the procedure set forth above has exhibited improved shelf life, the shelf life of the polymerization syrup can be further enhanced by incorporating from about 0.1 to about 20 parts by volume, more desirably from about 1 to about 5 parts by volume, tetrahydrofuran.

In addition, an effective minor amount of the internal mold release agent, as well as other additives which do not interfere with the quality or characteristics of the polymerization syrup, as well as a urethane monomer can be incorporated into the polymerization syrup prior to heating the polymerization syrup to achieve the desired viscosity.

B. In the preparation of the polymerization syrup of the present invention which is to be employed as a "drop" polymer, the procedure set forth in A above is employed with the exception that a catalytic amount of the quaternary ammonium salt is incorporated into the polymerization syrup prior to heating. The incorporation of the catalytic amount of the quaternary ammonium salt permits one to obtain a polymeric resin having the desired viscosity by heating the catalyzed polymerization syrup at a temperature from about 80° C. to about 110° C. for period of time of from about 10 to 20 minutes. Thereafter, the polymeric resin is cast into a mold while in its heated state.

C. When incorporating a particulate filler into the polymerization syrup prepared in accordance with the procedure set forth in A above, the particulate filler material is admixed with the syrup together with the catalytic amount of the quaternary ammonium salt. On the other hand, when incorporating the filler material into the resinous composition resulting from the preparation of the polymerization syrup in accordance with the procedures set forth in B above, the particulate material is desirably admixed into the polymeric composition prior to pouring the composition into a mold.

In order to further illustrate the present invention the following examples are given. However, it is to be understood that the examples are for illustrative purposes only and are not to be construed as limiting the scope of the subject invention.

EXAMPLE 1

A polymerization syrup was prepared by admixing the following ingredients to form an intimate blend:
2,679 ml of methyl methacrylate monomer
300 ml of diallyl diglycol carbonate (a carbonate monomer)
6 ml of n-dodecyl mercaptan
15 ml of ethylene glycol dimethacrylate The ingredients were stirred under suitable conditions to insure that the polymerization syrup was substantially homogenous in nature. The polymerization syrup was then heated in a water bath maintained at approximately 100° C. for about 15 minutes so as to provide the polymerization syrup with a predetermined viscosity. The polymerization syrup was then allowed to cool, placed in glass containers, sealed and stored in an area so that the polymerization syrup was not exposed to ultraviolet light.

An examination of the syrup was conducted to determine the intregrity of the syrup during the storage period. At the end of a 3 month period a slight deterioration of the syrup was detected, thus indicating that a polymerization syrup had a useful shelf life of about three months.

EXAMPLE 2

A polymerization syrup was formulated in accordance with the procedure of Example 1 with the exception that 6 ml of tetrahydrofuran was incorporated into the polymerization syrup prior to heating. After heating the polymerization syrup containing the tetrahydrofuran was cooled, placed in glass containers, sealed and stored under conditions similar to those of Example 1. Examinations of the polymerization syrup were conducted to determine the integrity of the polymerization syrup during the storage period. After a 4 month storage period no deterioration of the polymerization syrup could be detected, that is, the viscosity of the polymerization syrup was substantially unchanged and no polymer was visible. Thus, the experiment substantiated that by incorporating a minor effective amount of tetrahydrofuran into the polymerization syrup the shelf life of the polymerization syrup can be improved without the use of refrigeration.

EXAMPLE 3

0.1 ml of benzyltrimethylammonium chloride, a quaternary ammonium salt catalyst, was admixed with 3000 ml of a polymerization syrup prepared using the procedure of Example 1. The catalyzed polymerization syrup was poured into molds of various configurations having thicknesses of from about 1 to about 3 inches and allowed to cure at ambient temperature and atmospheric pressure. The curing time varied depending upon the thickness of the mold cavity, that is, the deeper the mold cavity the more rapid was the curing rate because of the exothermic nature of the catalyzed polymerization syrup.

After curing, the articles were removed from the mold. The articles had a tendency to adhere to the surface of the mold, and the thicker articles exhibited slight voids due to the rapid curing and the exothermic nature of the polymeric resin.

EXAMPLE 4

0.1 ml of benzyltrimethyl ammonium chloride catalyst and 1.5 part by volume of sodium dioctylsulfosuccinate, an anionic surfactant which functions as an internal mold release agent, were admixed with 3000 ml of a polymerization syrup formulated using the procedure of Example 2. The same molding conditions were carried out as in Example 3. After curing the articles were readily removable from the mold without adherence to the surface of the mold. Further, because of the incorporation of the tetrahydrofuran, the exothermic nature of the catalyzed polymerization syrup was more readily controlled and the molded articles showed no voids.

EXAMPLE 5

0.1 ml of benzyltrimethyl ammonium chloride catalyst, 1.5 parts by volume of sodium dioctylsulfosuccinate, an anionic surfactant which functions as an internal mold release agent, and 10 ml of an urethane monomer (i.e. a urethane/acrylic monomer blend marketed by Radcure Specialties, Inc. of Louisville, Ky. under the trademark "Ebecryl 264") were admixed with 3000 ml of a polymerization syrup formulated using the procedures of Example 1. The resulting resinous composition was poured into molds of various configurations having mold cavities of up to about three inches in depth. The resin composition was allowed to cure at ambient temperature and pressure. The curing for the resinous composition varied depending upon the thickness of the mold cavity, that is, the deeper the mold cavity the more rapid was the curing rate because of the exothermic nature of the resinous composition.

After curing the articles were readily removable from the mold without adherence to the mold. Further, the molded articles exhibited enhanced optical clarity and surface hardness when compared with articles molded from polymeric resins which did not contain the urethane monomer.

EXAMPLE 6

A polymerization syrup prepared in accordance with Example 1 was admixed with an effective amount of an alumina trihydrate filler so as to provide the polymerization syrup with about 50 weight percent of the alumina trihydrate. The alumina trihydrate had an average particle size of about 30+/−10 microns.

0.1 ml of benzyltrimethyl ammonium chloride catalyst and 1.5 parts by volume of sodium dioctylsulfosuccinate was admixed with the particulate containing polymerization syrup. The catalyst activated particulate filled polymerization syrup was poured into molds having mold cavity ranging from about 1 to 4 inches in depth. The molds were maintained in a static condition and no vacuum was applied thereto during the curing process. That is, the molds were not vibrated nor was a vacuum employed during the curing process in order to remove entrained air from the poured particulate filled polymerization syrup. Further, no heat was applied to the catalyzed particulate filled polymerization syrup and the poured articles were allowed to cure at atmospheric pressure and ambient temperature.

The pour to pull time varied depending upon the depth of the mold cavities and thus the thickness of the article molded therein. At the end of the curing period the articles were removed from the molds and examined. The articles appeared to be uniform throughout and no air bubbles were detected in the cured articles. Further, the cured articles were readily removable from the molds.

EXAMPLE 7

A polymerization syrup prepared in accordance with Example 2 was admixed with an effective amount of an alumina trihydrate filler so as to provide the polymerization syrup with about 50 weight percent of the alumina trihydrate. The alumina trihydrate had an average particle size of about 30+/−10 microns. The resulting blend contained about 50 percent by weight of the aluminitrihydrate filler.

0.1 ml of benzyltrimethyl ammonium chloride catalyst and 1.5 parts by volume of sodium dioctylsulfosuccinate was admixed with the particulate containing polymerization syrup.

The catalyst activated particulate filled polymerization syrup was poured into molds having a thickness of depth from 1 to 4 inches in depth. The molds were maintained in a static condition and no vacuum was applied thereto during the curing process. That is, the molds were not vibrated nor was a vacuum employed during the curing process in order to remove entrained air from the poured particulate filled polymerization syrup. Further, no heat was applied to the catalyzed particulate filled polymerization syrup and the poured articles were allowed to cure at atmospheric pressure and ambient temperature.

The pour to pull time varied depending upon the depth of the mold cavities and thus the thickness of the article molded therein. At the end of the curing period the articles were removed from the molds and examined. The articles appeared to be uniform throughout and no air bubbles were detected in the cured articles. Further, the cured articles were readily removable from the molds.

The polymeric resins formulated as set forth herein, provide articles having excellent weatherability, outstanding color and transparency, solvent resistance, impact strength and surface hardness. Further, by incorporating a particulate filler into the polymerization syrup prior to catalyzing the polymerization syrup one can produce articles which are substantially uniform or homogeneous in matrix structure and have an appearance similar to that of polished national granite.

It is clear that the present invention is well adapted to carry out the objects and obtain the ends and advantages mentioned therein. While presently preferred embodiments of the invention have been described for purposes of this disclosure, numerous changes may be made which will readily suggest them selves to those skilled in the art and which are encompassed within the spirit of the invention disclosed and as defined in the appended claims.

What is claimed is:

1. A polymerization syrup having an improved shelf life, the polymerization syrup consisting essentially of:

from about 10 to about 990 parts by volume of an acrylic monomer represented by the formula $$CH_2=\underset{\underset{CH_3}{|}}{C}-COOR$$

wherein R is an alkyl moiety containing 1 to about 18 carbon atoms;

from about 990 to about 10 parts by volume diallyl diglycol carbonate monomer;

from about 0.1 to about 20 parts by volume of a mercaptan; and from about 0.3 to about 300 parts by volume of a crosslinking agent compatible with the acrylic monomer and the diallyl diglycol carbonate monomer.

2. The polymerization syrup of claim 1 wherein the syrup further includes from about 0.1 to about 20 parts by volume tetrahydrofuran.

3. The polymerization syrup of claim 1 wherein the polymerization syrup contains from about 500 to about 700 parts by volume of the acrylic monomer and from about 300 to about 500 parts by volume of the diallyl diglycol carbonate monomer and wherein the mercaptan is represented by the formula $$R'SH$$

wherein R' is an alkyl moiety containing from 1 to about 22 carbon atoms.

4. The polymerization syrup of claim 3 wherein the acrylic monomer is methylacrylate.

5. The polymerization syrup of claim 4 wherein the mercaptan in n-octyl mercaptan and the crosslinking agent is ethylene glycol dimethacrylate.

6. The polymerization syrup of claim 1 which further includes a minor effective amount of an internal mold release agent compatible with the acrylic monomer and the diallyl diglycol carbonate monomer.

7. The polymerization syrup of claim 6 wherein the minor effective amount of the internal mold release agent is an amount sufficient to provide from about 0.01 to about 2 parts by volume of the internal mold release agent in the polymerization syrup.

8. The polymerization syrup of claim 7 wherein the internal mold release agent is selected from the group consisting of anionic and nonionic surfactants.

9. The polymerization syrup of claim 1 wherein the syrup further includes from about 30 to about 100 parts by volume of a urethane monomer compatible with the acrylic monomer and the diallyl diglycol carbonate monomer.

10. The polymerization syrup of claim 9 wherein the syrup further includes from about 0.1 to about 20 parts by volume tetrahydrofuran.

11. The polymerization syrup of claim 10 wherein the syrup further includes a minor effective amount of an internal mold release agent.

* * * * *